Dec. 19, 1933.    L. E. LA BRIE    1,940,457
OPERATING MECHANISM
Filed March 5, 1929
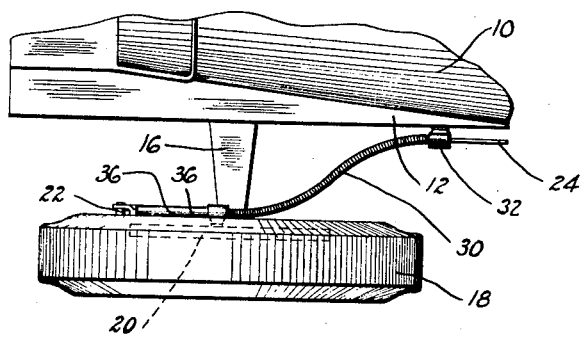
FIG.1
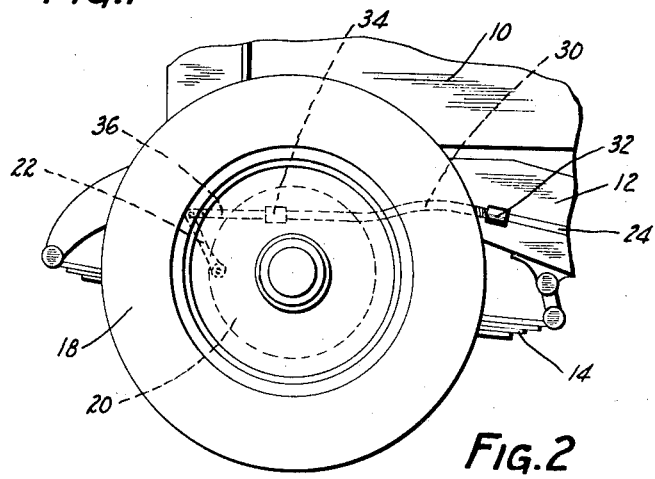
FIG.2
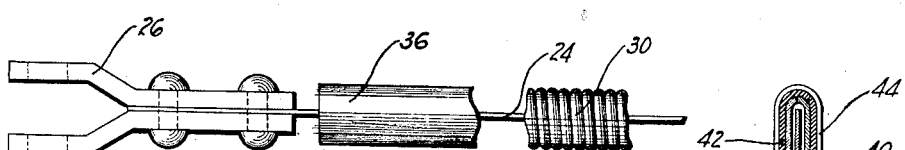
FIG.3
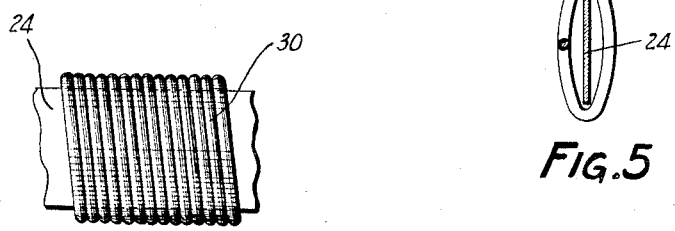
FIG.4
FIG.5
FIG.6
INVENTOR
LUDGER E. LA BRIE
BY
ATTORNEY Patented Dec. 19, 1933

1,940,457

UNITED STATES PATENT OFFICE 1,940,457

OPERATING MECHANISM

Ludger E. La Brie, South Bend, Ind., assignor to Bendix Brake Company, South Bend, Ind., a corporation of Illinois Application March 5, 1929. Serial No. 344,340

1 Claim. (Cl. 74—39)

This invention relates to operating mechanism for brakes or the like, and is illustrated as embodied in novel means for operating a brake on a swiveled front automobile wheel. An object of the invention is to provide simple and inexpensive operating means, preferably of the Bowden cable type, including an operating element of high tensile strength which is yet highly flexible, for example to facilitate the swiveling of the wheel.

In one desirable arrangement, the operating element is a metal ribbon, preferably of steel, arranged in a flexible conduit which is fixed at its ends against movement with the ribbon, and which acts as a Bowden conduit to maintain substantially unchanged at all times the length of the portion of the ribbon which is housed therein. When used in operating an automobile brake, the ribbon is arranged with its breadth extending vertically, thus giving a high degree of flexibility in a horizontal plane, while on the other hand the relatively great vertical breadth of the ribbon gives it a high tensile strength. The attachment of the end of the conduit to the frame, or its equivalent, may be a very substantial distance behind the wheel, so that the up-and-down movements of the frame with respect to the wheel are of very small angular amplitude in their effect on the conduit and ribbon, which of course are much less flexible vertically than horizontally.

The above and other objects and features of the invention, including various details of conduit structure and other desirable constructions, will be apparent from the following description of the illustrative embodiment shown in the accompanying drawing, in which:

Figure 1 is a top plan view of the left front corner of an automobile, showing the arrangement of the control mechanism with respect to the swiveled wheel;

Figure 2 is a side elevation of the parts shown in Figure 1;

Figure 3 is a partial plan view, on an enlarged scale, of one end of the ribbon and its conduit, with the latter broken away;

Figure 4 is a side elevation of part of the ribbon and conduit shown in Figure 3;

Figure 5 is an end view of the piece of ribbon and conduit shown in Figure 3; and Figure 6 is a view corresponding to Figure 5, but showing a different form of conduit.

In the arrangement illustrated, the body 10 (including a chassis frame 12) of an automobile is supported by the usual springs 14 on a front axle 16 carried by swiveled road wheels 18 having brakes 20. Each brake is operated by means such as a camshaft lever 22 swiveling with the wheel.

According to the present invention, lever 22 or its equivalent is operated by means such as a steel ribbon 24, having riveted at its end a clevis 26 pivoted to the lever 22. This clevis is shown built up of two bent pieces of metal riveted together by the same rivets that attach them to the ribbon 24. It should be noted that ribbon 24 is relatively small in horizontal thickness, so that it has a high degree of horizontal flexibility permitting the swiveling of the wheel 18, while at the same time it is relatively wide vertically so that it has a high tensile strength.

The portion of the ribbon between frame 12 and the wheel is inclosed in a Bowden type conduit 30, having one end secured in a fitting 32 secured to the frame and having the other end secured in a fitting 34 secured to the brake backing plate and swiveling with the wheel. The part of the ribbon between fitting 34 and lever 22 may be housed in a flexible leather or rubber boot 36. As shown best in Figure 5, the conduit is formed with its coils elliptical in shape, to conform to the shape of the ribbon.

The fitting 32 is a considerable distance behind the wheel, so that the amplitude of the angular movements of the conduit and ribbon, due to up-and-down movements of frame 12 as the spring 14 flexes in use, are comparatively small, since obviously the ribbon and conduit are much less flexible vertically than horizontally.

In Figure 6, the conduit is made up of two channel-shaped steel ribbons 40, facing toward each other and inclosing the operating ribbon 24. These form a flexible conduit which may be covered by rubberized fabric 42, held if desired by a spirally-wound outer wire 44.

While illustrative constructions have been described in detail, it is not my intention to limit the scope of the invention to those particular constructions, or otherwise than by the terms of the appended claim.

I claim:

A control for a brake or the like comprising a flat flexible ribbon, connecting means including a pair of members embracing the end of the ribbon between them and fastened to said end and to each other, and a flexible conduit housing the part of the ribbon beyond the connecting means.

LUDGER E. LA BRIE.